US009164548B2

(12) United States Patent
Chuang et al.

(10) Patent No.: US 9,164,548 B2
(45) Date of Patent: Oct. 20, 2015

(54) TOUCH PANEL AND HANDHELD ELECTRONIC DEVICE UTILIZING THE SAME

(75) Inventors: I-Cheng Chuang, Taoyuan County (TW); Chih-Kai Hu, Taoyuan County (TW); Chun-Lung Huang, Taoyuan County (TW); Shih-Po Chien, Taoyuan County (TW); Yi-Ting Liu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 509 days.

(21) Appl. No.: 13/445,919

(22) Filed: Apr. 13, 2012

(65) Prior Publication Data

US 2013/0271384 A1    Oct. 17, 2013

(51) Int. Cl.
*G06F 3/041* (2006.01)
*G06F 1/16* (2006.01)
*G06F 3/044* (2006.01)

(52) U.S. Cl.
CPC .............. *G06F 1/1643* (2013.01); *G06F 3/044* (2013.01)

(58) Field of Classification Search
CPC ........ G06F 1/1643; G06F 3/041; G06F 3/044
USPC ......................................................... 345/173
See application file for complete search history.

(56) References Cited

U.S. PATENT DOCUMENTS

| 7,948,477 B2 | 5/2011 | Hotelling |
| 8,724,038 B2 * | 5/2014 | Ganapathi et al. .............. 349/12 |
| 2006/0012578 A1 | 1/2006 | Ohtake |
| 2008/0122802 A1 * | 5/2008 | Furuhashi et al. ............ 345/174 |
| 2008/0143683 A1 * | 6/2008 | Hotelling ....................... 345/173 |
| 2009/0085891 A1 * | 4/2009 | Yang et al. ..................... 345/174 |
| 2011/0001717 A1 * | 1/2011 | Hayes et al. ................... 345/173 |
| 2011/0012841 A1 * | 1/2011 | Lin ................................ 345/173 |
| 2011/0089011 A1 | 4/2011 | Ozaki |

FOREIGN PATENT DOCUMENTS

| TW | 200713337 | 4/2007 |
| TW | M386547 | 8/2010 |
| TW | M405597 | 6/2011 |
| TW | 201200939 | 1/2012 |
| TW | M420776 | 1/2012 |
| TW | 201210442 | 3/2012 |

OTHER PUBLICATIONS

"Office Action of Taiwan Counterpart Application", issued on Apr. 16, 2014, p. 1-11, in which the listed references were cited.

* cited by examiner

*Primary Examiner* — Kwang-Su Yang
(74) *Attorney, Agent, or Firm* — Jianq Chyun IP Office

(57) ABSTRACT

A touch panel including a first transparent flexible substrate, a plurality of first connection lines, a plurality of second connection lines, a first sensing layer, and a second sensing layer is provided. The first transparent flexible substrate has a first side and a second side and includes a first carrying portion and a first leading portion. The first connection lines and the second connection lines are respectively disposed at the first side and the second side and are extended from the first carrying portion to the first leading portion. The first sensing layer and the second sensing layer have plural transparent electrode patterns and are respectively disposed at the first side and the second side of the first carrying portion. The transparent electrode patterns are respectively connected with the first connection lines and the second connection lines. A handheld electronic device with a touch input function is also provided.

16 Claims, 10 Drawing Sheets

TOUCH PANEL AND HANDHELD ELECTRONIC DEVICE UTILIZING THE SAME

BACKGROUND

1. Field of the Application

The application generally relates to an input device, and more particularly, to a touch panel and a handheld electronic device using the same.

2. Description of Related Art

In recent years, the digital information and wireless mobile communication technologies have been developing quickly. Many digital electronic products, such as mobile phones and personal digital assistants (PDAs), have abandoned the conventional keyboards and mouses and adopt touch panels as their input devices, so as to achieve high portability, small volume, and operation humanization.

Touch panels can be categorized into resistive touch panels, capacitive touch panels, optical touch panels, acoustic wave touch panels, and electromagnetic touch panels according to the adopted sensing techniques. Among aforementioned touch panels, resistive and capacitive touch panels are the most popular ones. In a capacitive touch panel, one or more layers of conductive films with transparent electrode patterns are adhered to a substrate to form a touch sensor. A user can operate on the capacitive touch panel by simply touching the surface thereof. Thereby, capacitive touch panels offer such advantages as short response time, high reliability, and high durability.

FIG. 1 is a side view of a conventional touch panel. Referring to FIG. 1, an adhesive layer 120 (for example, an optical clear adhesive (OCA)) is coated on a sensor 110 formed by one or more layers of conductive films with transparent electrode patterns. A conductive layer 130 (for example, an anisotropic conductive film (ACF)) is coated over the edge of the sensor 110 to attach one side of a flexible printed circuit (FPC) 140 to the edge of the sensor 110, so as to electrically connect conductive lines on the FPC 140 to the transparent electrode patterns on the sensor 110. Eventually, a transparent cover 150 is attached onto the sensor 110 through the adhesive layer 120 to form the touch panel 100. However, as shown in FIG. 1, in the touch panel 100, the FPC 140 needs to be attached to the edge of the sensor 110. Thus, the touch panel 100 is manufactured through a complicated process with high cost, and the problem of uneven adhesion may be produced therein.

SUMMARY

Accordingly, the application is directed to a touch panel with reduced manufacturing cost, simplified manufacturing process, and evenly adhered areas.

The application is directed to a handheld electronic device using aforementioned touch panel as its input device.

The application provides a touch panel including a first transparent flexible substrate, a plurality of first connection lines, a plurality of second connection lines, a first sensing layer, and a second sensing layer. The first transparent flexible substrate has a first side and a second side opposite to the first side, and the first transparent flexible substrate includes a first carrying portion and a first leading portion connected to an edge of the first carrying portion. The first connection lines are disposed at the first side and are extended from the first carrying portion to the first leading portion. The second connection lines are disposed at the second side and are extended from the first carrying portion to the first leading portion. The first sensing layer includes a plurality of first transparent electrode patterns and is disposed at the first carrying portion and located at the first side, and the first transparent electrode patterns are respectively connected with the first connection lines. The second sensing layer includes a plurality of second transparent electrode patterns and is disposed at the first carrying portion and located at the second side, and the second transparent electrode patterns are respectively connected with the second connection lines.

The application also provides a handheld electronic device including a body, a main processor system, a display panel, and the touch panel described above. The body has a display opening. The main processor system is disposed in the body. The display panel is disposed at the display opening and is electrically connected to the main processor system. The touch panel is disposed on the display panel.

As described above, in a touch panel provided by the application, connection lines extended from a first carrying portion to a first leading portion are respectively disposed at both sides of a first transparent flexible substrate, and sensing layers with transparent electrode patterns are respectively disposed, so as to respectively connect the transparent electrode patterns with the corresponding connection lines. Thereby, the touch panel offers reduced manufacturing cost, simplified manufacturing process, reduced lateral size, and evenly adhered areas. Moreover, the application also provides a handheld electronic device. The handheld electronic device uses the touch panel as its input device therefore offers a convenient operation experience.

These and other exemplary embodiments, features, aspects, and advantages of the application will be described and become more apparent from the detailed description of exemplary embodiments when read in conjunction with accompanying drawings.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF THE EMBODIMENTS

Figure 1:
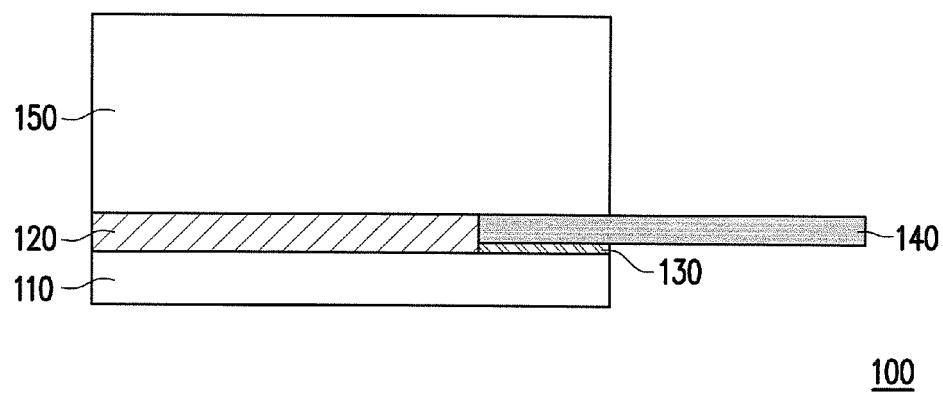
FIG. 1 is a side view of a conventional touch panel.

Reference will now be made in detail to the present preferred embodiments of the application, examples of which are illustrated in the accompanying drawings. Wherever possible, the same reference numbers are used in the drawings and the description to refer to the same or like parts.

Figure 2:
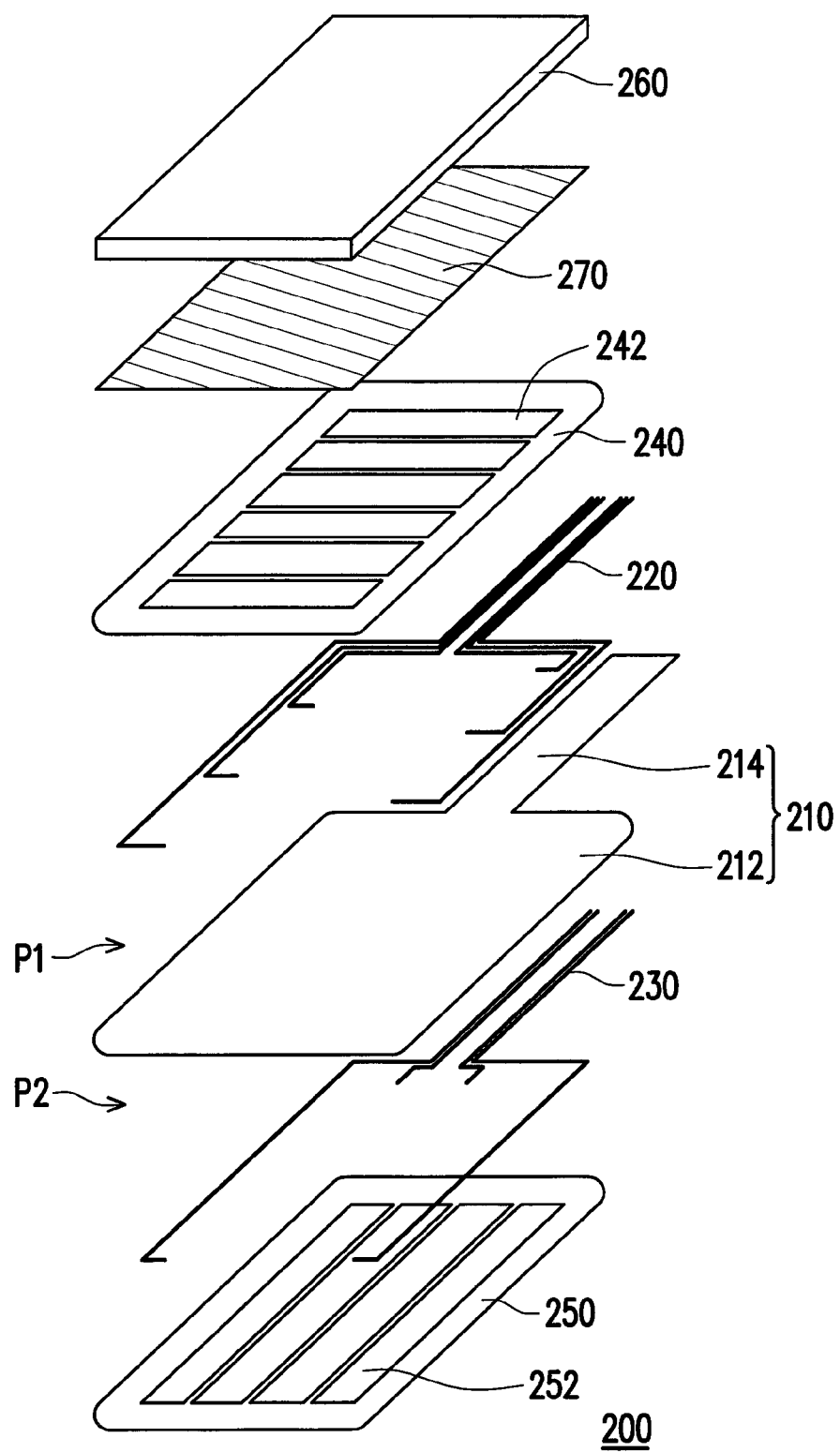
FIG. 2 is an explosion diagram of a touch panel according to an embodiment of the application.

FIG. 2 is an explosion diagram of a touch panel according to an embodiment of the application. Referring to FIG. 2, in the present embodiment, the touch panel 200 includes a first transparent flexible substrate 210, a plurality of first connection lines 220, a plurality of second connection lines 230, a first sensing layer 240, and a second sensing layer 250. The first transparent flexible substrate 210 has a first side P1 and a second side P2 opposite to the first side P1. Besides, the first transparent flexible substrate 210 includes a first carrying portion 212 and a first leading portion 214 connected to an edge of the first carrying portion 212. The material of the first transparent flexible substrate 210 includes polymer. In the present embodiment, the material of the first transparent flexible substrate 210 is polyethylene terephthalate (PET). However, the application is not limited thereto, and in other embodiments of the application, the material of the first transparent flexible substrate 210 may be any other material of the same characteristic.

The first connection lines 220 are disposed at the first side P1 and extended from the first carrying portion 212 to the first leading portion 214, and the second connection lines 230 are disposed at the second side P2 and extended from the first carrying portion 212 to the first leading portion 214. The first sensing layer 240 includes a plurality of first transparent electrode patterns 242. The first sensing layer 240 is disposed at the first side P1 of the first carrying portion 212 so that the first transparent electrode patterns 242 are respectively connected to the first connection lines 220. The second sensing layer 250 includes a plurality of second transparent electrode patterns 252. The second sensing layer 250 is disposed at the second side P2 of the first carrying portion 212 so that the second transparent electrode patterns 252 are respectively connected to the second connection lines 230.

In the present embodiment, the first sensing layer 240 is attached to the first side P1 of the first transparent flexible substrate 210, and the first connection lines 220 are located between the first sensing layer 240 and the first transparent flexible substrate 210. The second sensing layer 250 is attached to the second side P2 of the first transparent flexible substrate 210, and the second connection lines 230 are located between the second sensing layer 250 and the first transparent flexible substrate 210. The touch panel 200 further includes a transparent cover 260 and an adhesive layer 270. The adhesive layer 270 is disposed on the first sensing layer 240 so that the transparent cover 260 is adhered to the first sensing layer 240 through the adhesive layer 270.

To be specific, the first connection lines 220 are disposed along the edge of the first carrying portion 212 at the first side P1 and extended to the first leading portion 214. The first sensing layer 240 is adhered to the first side P1 of the first carrying portion 212 so that the first connection lines 220 are respectively connected with the corresponding first transparent electrode patterns 242. Accordingly, the first connection lines 220 can be considered as being disposed on the first side P1 of the first carrying portion 212 and corresponding to the first transparent electrode patterns 242. Thus, when the first sensing layer 240 is adhered to the first side P1 of the first carrying portion 212, the first transparent electrode patterns 242 can be precisely connected with the corresponding first connection lines 220.

The second connection lines 230 are disposed along the edge of the first carrying portion 212 at the second side P2 and extended to the first leading portion 214. The second sensing layer 250 is adhered to the second side P2 of the first carrying portion 212 so that the second connection lines 230 are respectively connected with the corresponding second transparent electrode patterns 252. Accordingly, the second connection lines 230 can be considered as being disposed on the second side P2 of the first carrying portion 212 and corresponding to the second transparent electrode patterns 252. Thus, when the second sensing layer 250 is adhered to the second side P2 of the first carrying portion 212, the second transparent electrode patterns 252 can be precisely connected with the corresponding second connection lines 230.

Additionally, in the present embodiment, the first transparent electrode patterns 242 and the second transparent electrode patterns 252 are respectively striped patterns, and the extended direction of the first transparent electrode patterns 242 is substantially perpendicular to that of the second transparent electrode patterns 252, as shown in FIG. 2. Accordingly, after the first sensing layer 240 and the second sensing layer 250 are respectively adhered to the first side P1 and the second side P2 of the first carrying portion 212, the stripe-shaped first transparent electrode patterns 242 and second transparent electrode patterns 252 form a cross over net structure such that the touch panel 200 can work through touch sensing.

The material of the first connection lines 220 and the second connection lines 230 includes a metal or a transparent conductive material. In the present embodiment, the first connection lines 220 and the second connection lines 230 are indium tin oxide (ITO) lines. However, in other embodiments of the application, the first connection lines 220 and the second connection lines 230 may also be made of copper or any other metal or any other transparent conductive material.

The material of the first transparent electrode patterns 242 and the second transparent electrode patterns 252 includes a transparent conductive material. In the present embodiment, the material of the first transparent electrode patterns 242 and the second transparent electrode patterns 252 is ITO. However, the application is not limited thereto, and in other embodiments of the application, the material of the first transparent electrode patterns 242 and the second transparent electrode patterns 252 may also be any other transparent conductive material, such as indium zinc oxide (IZO), aluminum zinc oxide (AZO), gallium zinc oxide (GZO), In2O3, ZnO, TiO2, or. SnO2.

Figure 3A:
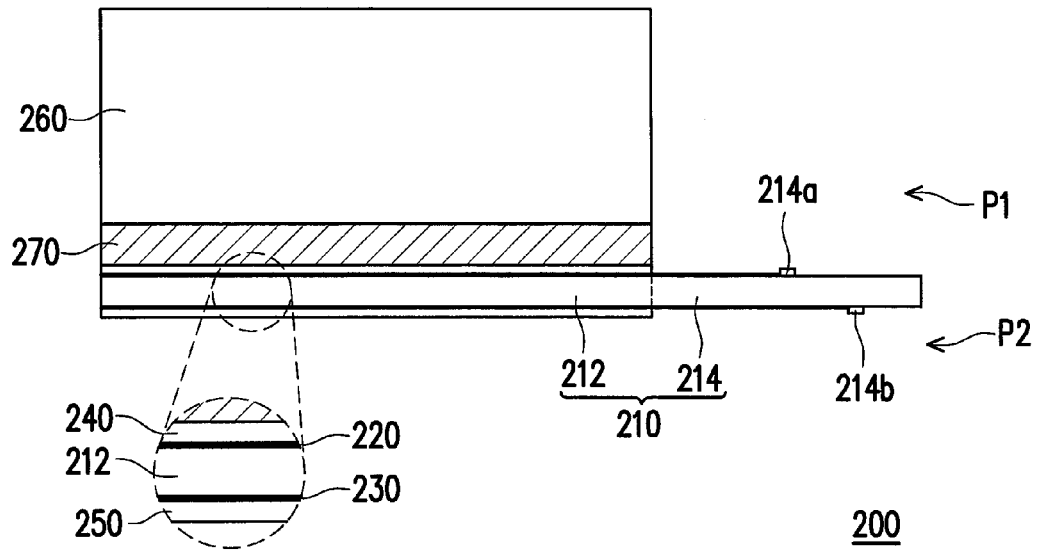
FIG. 3A is a side view of the touch panel in FIG. 2.

FIG. 3A is a side view of the touch panel in FIG. 2. Referring to FIG. 3A, in the present embodiment, the first carrying portion 212, the first sensing layer 240, and the second sensing layer 250 have substantially the same shape and size. Thus, after the first sensing layer 240 and the second sensing layer 250 are respectively adhered to the first carrying portion 212 of the first transparent flexible substrate 210, the first connection lines 220 between the first sensing layer 240 and the first transparent flexible substrate 210 and the second connection lines 230 between the second sensing layer 250 and the first transparent flexible substrate 210 can be led out of the first sensing layer 240 and the second sensing layer 250 through the first leading portion 214.

The first connection lines 220 and the second connection lines 230 extended from the first carrying portion 212 to the first leading portion 214 of the first transparent flexible substrate 210 can be electrically connected to an external device through a plurality of first contacts 214a and a plurality of second contacts 214b on the first leading portion 214 and the first leading portion 214.

To be specific, the first leading portion 214 has a plurality of first contacts 214a and a plurality of second contacts 214b. The first contacts 214a and the second contacts 214b are respectively disposed on two sides of the first leading portion 214 and are respectively connected with the first connection lines 220 between the first sensing layer 240 and the first transparent flexible substrate 210 and the second connection lines 230 between the second sensing layer 250 and the first transparent flexible substrate 210, as shown in FIG. 3A.

Figure 3B:
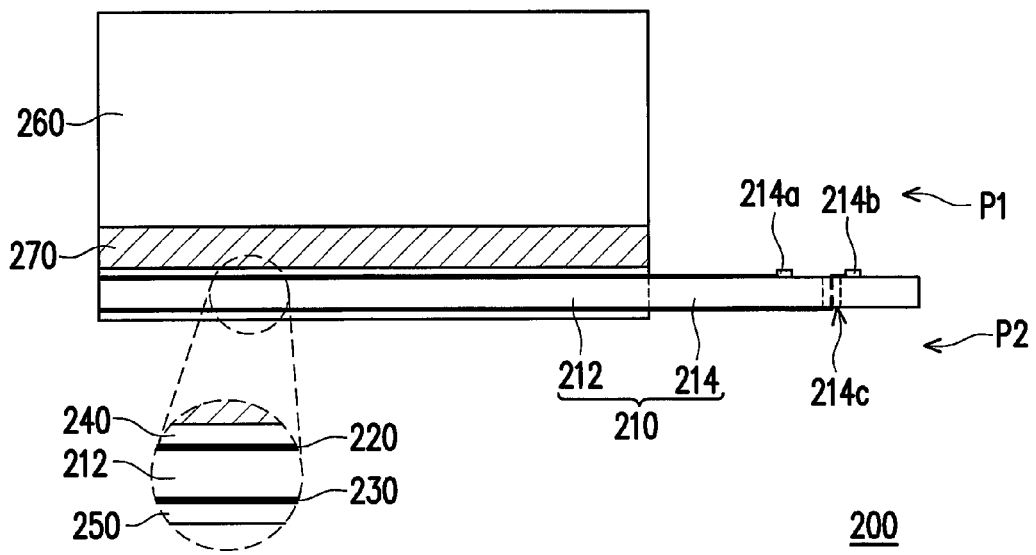
FIG. 3B is a side view of a touch panel according to another embodiment of the application.

FIG. 3B is a side view of a touch panel according to another embodiment of the application. Referring to FIG. 3B, in the present embodiment, the first contacts 214a and the second contacts 214b on the first leading portion 214 are disposed on the same side of the first leading portion 214. To be specific, the first leading portion 214 has conductive holes 214c, and the second connection lines 230 at the second side P2 of the first leading portion 214 are extended to the first side P1 through the conductive holes 214c, as shown in FIG. 3B. Accordingly, the first contacts 214a and the second contacts 214b disposed at the first side P1 of the first leading portion 214 can be respectively connected with the first connection lines 220 between the first sensing layer 240 and the first transparent flexible substrate 210 and the second connection lines 230 between the second sensing layer 250 and the first transparent flexible substrate 210.

Thereby, regardless of whether the first contacts 214a and the second contacts 214b are respectively disposed on two sides of the first leading portion 214 or are disposed on the same side of the first leading portion 214, the first connection lines 220 and the second connection lines 230 can always be electrically connected to an external device through the first leading portion 214, the first contacts 214a, and the second contacts 214b. When the external device provides a signal to the touch panel 200, the signal can be transmitted to the corresponding first transparent electrode pattern 242 and second transparent electrode pattern 252 through the first connection lines 220 and the second connection lines 230, so as to allow the touch panel 200 to achieve the touch sensing function.

Reference will now be made in detail to the present embodiment of the application, wherein like reference numerals refer to the like elements throughout, and similar technical contents can be referred to the embodiment described above therefore will not be described in following embodiments.

Figure 4:
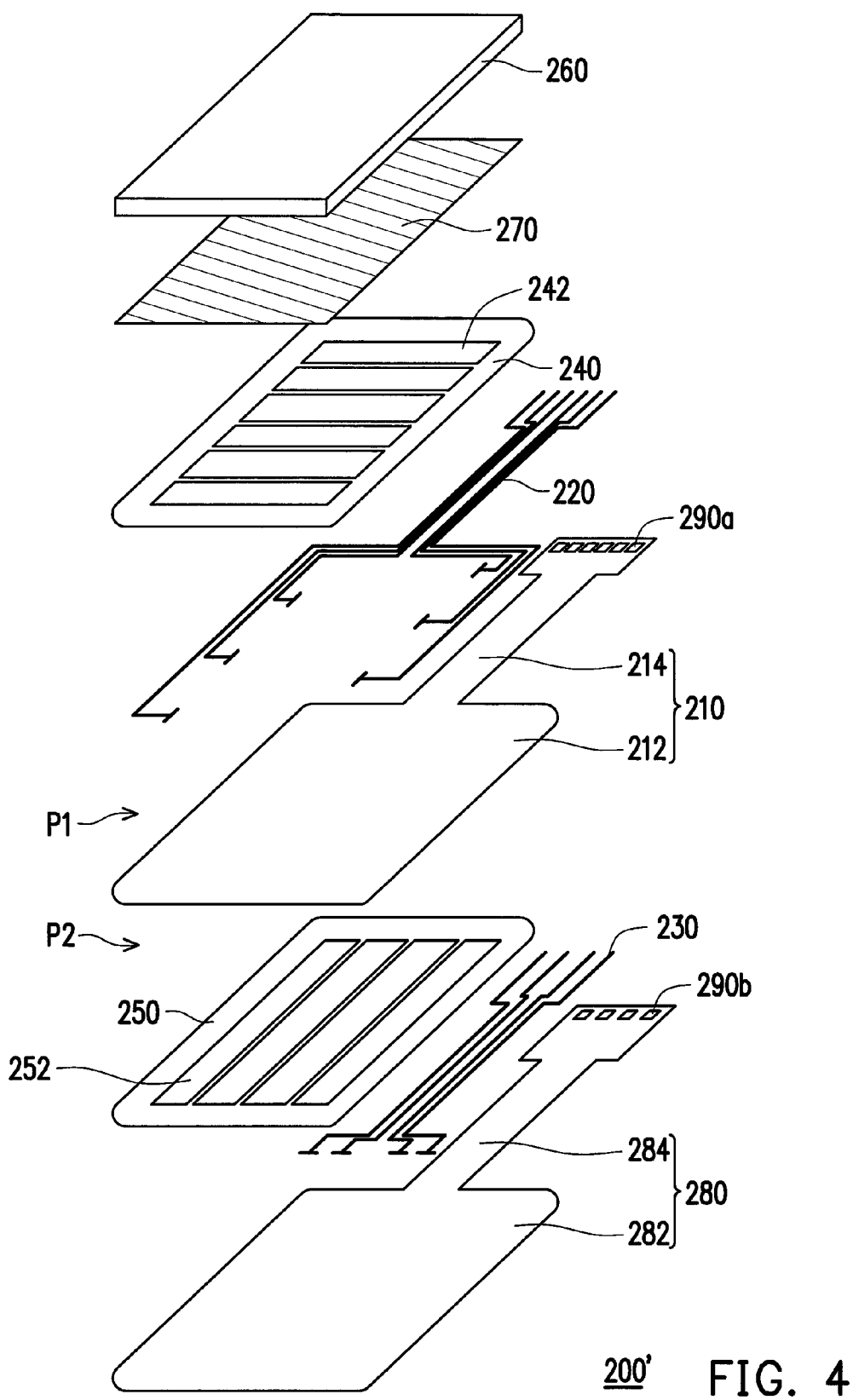
FIG. 4 is an explosion diagram of a touch panel according to another embodiment of the application.

FIG. 4 is an explosion diagram of a touch panel according to another embodiment of the application. Referring to FIG. 4, the major difference between the touch panel 200' in the present embodiment and the touch panel 200 in foregoing embodiment is that besides the touch panel 200, the touch panel 200' further includes a second transparent flexible substrate 280, and the first transparent flexible substrate 210 is attached to the second transparent flexible substrate 280. The material of the second transparent flexible substrate 280 includes polymer. The material of the second transparent flexible substrate 280 may be the same as or different from the material of the first transparent flexible substrate 210. However, the application is not limited herein.

To be specific, in the present embodiment, the first sensing layer 240 of the touch panel 200' is attached to the first side P1 of the first transparent flexible substrate 210 so that the first connection lines 220 are located between the first sensing layer 240 and the first transparent flexible substrate 210. The second sensing layer 250 of the touch panel 200' is attached to one side of the second transparent flexible substrate 280 so that the second connection lines 230 are located between the second sensing layer 250 and the second transparent flexible substrate 280.

In the present embodiment, the second transparent flexible substrate 280 includes a second carrying portion 282 and a second leading portion 284 connected to an edge of the second carrying portion 282. Accordingly, the second connection lines 230 are located between the second sensing layer 250 and the second transparent flexible substrate 280, disposed along the edge of the second carrying portion 282, and extended to the second leading portion 284.

In other words, the first connection lines 220 and the second connection lines 230 of the touch panel 200' are respectively disposed on the first transparent flexible substrate 210 and the second transparent flexible substrate 280, and the first sensing layer 240 and the second sensing layer 250 are respectively adhered to the first transparent flexible substrate 210 and the second transparent flexible substrate 280. After sequentially attaching the connection lines and the sensing layers to the two transparent flexible substrates, the first transparent flexible substrate 210 is attached to the second transparent flexible substrate 280 to allow the touch panel 200' to achieve the touch sensing function.

Figure 5:
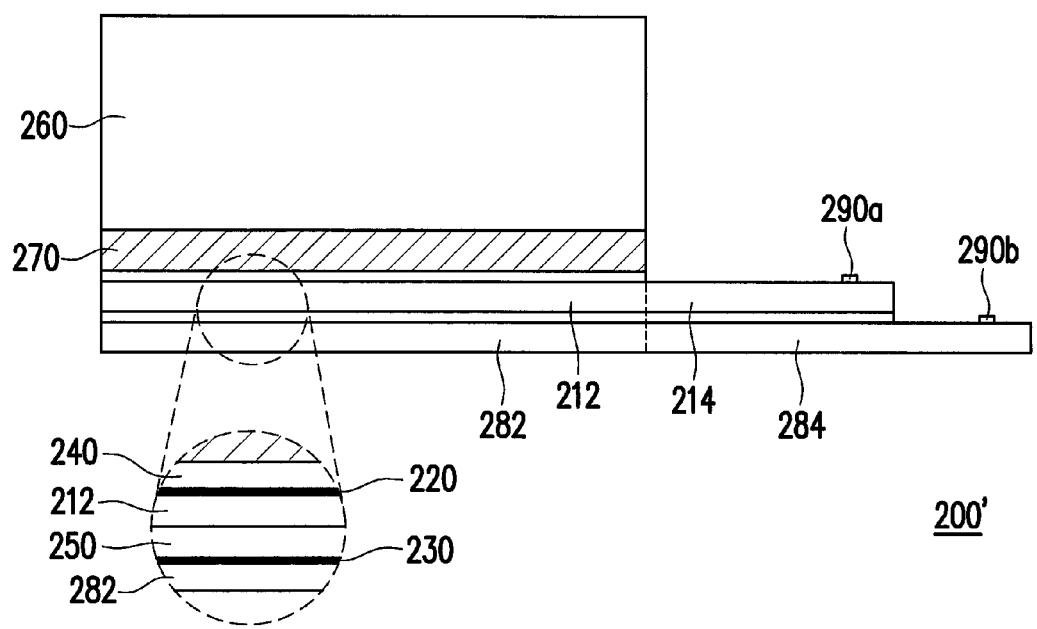
FIG. 5 is a side view of the touch panel in FIG. 4.

FIG. 5 is a side view of the touch panel in FIG. 4. Referring to FIG. 5, in the present embodiment, the first carrying portion 212 and the second carrying portion 282 have substantially the same size and shape, and the first carrying portion 212, the first sensing layer 240, and the second sensing layer 250 described above have substantially the same size and shape. Thus, when the first transparent flexible substrate 210 is attached to the second transparent flexible substrate 280, the first connection lines 220 between the first sensing layer 240 and the first transparent flexible substrate 210 and the second connection lines 230 between the second sensing layer 250 and the second transparent flexible substrate 280 can be led out of the first sensing layer 240 and the second sensing layer 250 through the first leading portion 214 and the second leading portion 284.

On the other hand, the first leading portion 214 covers the second leading portion 284 and exposes the endmost part of the upper surface of the second leading portion 284, so that the ends of the first leading portion 214 and the second leading portion 284 form a stepped structure. The touch panel 200' further includes a plurality of first contacts 290a and a plurality of second contacts 290b. The first contacts 290a are disposed on the upper surface of the first leading portion 214 and are respectively connected with the first connection lines 220. The second contacts 290b are disposed on the exposed endmost part of the upper surface of the second leading portion 284 and are respectively connected with the second connection lines 230.

In a word, the difference between the connection line structures of the touch panel 200' and the touch panel 200 is that in the touch panel 200, the first connection lines 220 and the second connection lines 230 are respectively disposed at both sides of the first transparent flexible substrate 210, while in the touch panel 200', the first connection lines 220 and the second connection lines 230 are respectively disposed on the first transparent flexible substrate 210 and the second transparent flexible substrate 280, and two transparent flexible substrates are then adhered. Namely, in the touch panel 200', the first connection lines 220 and the second connection lines 230 are distributed on the two transparent flexible substrates. Accordingly, the circuit layout area on a single transparent flexible substrate can be reduced.

Figure 6A:
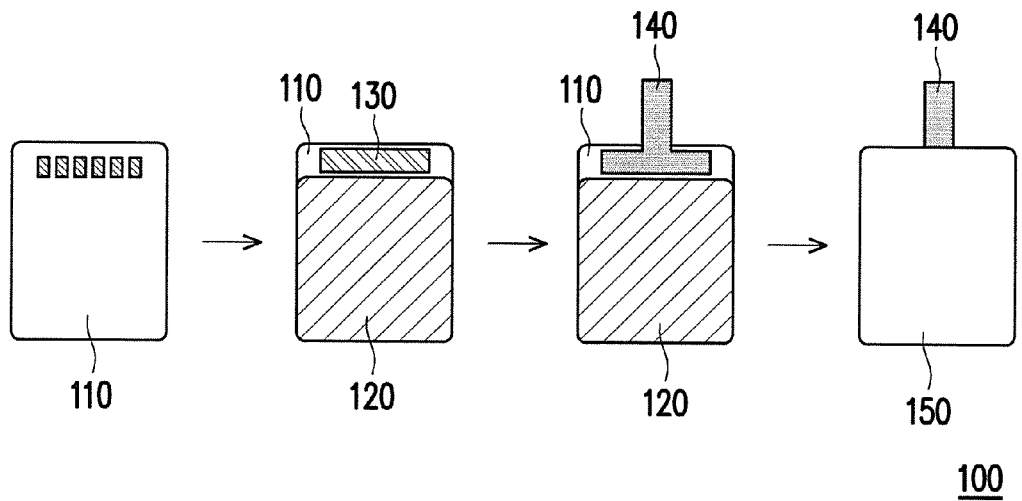
FIG. 6A is a top-view flowchart of fabricating the touch panel in FIG. 1.

FIG. 6A is a top-view flowchart of fabricating the touch panel in FIG. 1. Referring to FIG. 6A, in the touch panel 100, one or more layers of conductive films are first disposed to form the sensor 110, so as to form the touch sensing units. The adhesive layer 120 is then coated on the sensor 110, and the adhesive conductive layer 130 is disposed at the edge of the sensor 110 to attach one side of the FPC 140 to the sensor 110.

Finally, the transparent cover 150 is attached to the sensor 110 through the adhesive layer 120 to complete the touch panel 100.

Figure 6B:
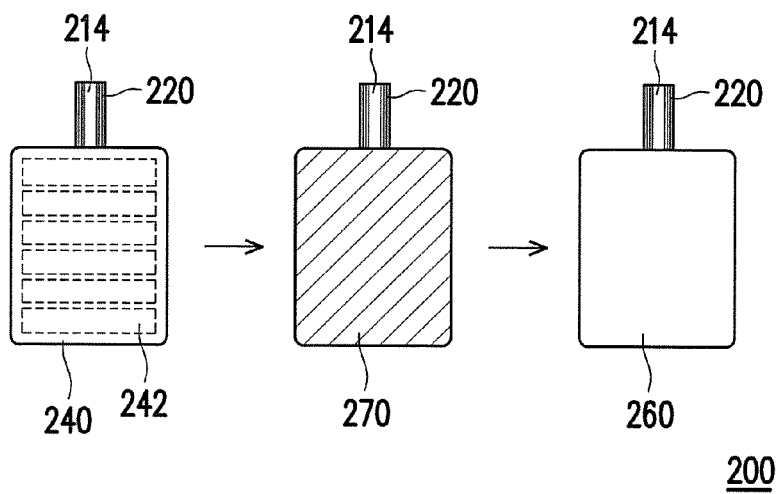
FIG. 6B is a top-view flowchart of fabricating the touch panel in FIG. 2.

FIG. 6B is a top-view flowchart of fabricating the touch panel in FIG. 2. Referring to FIG. 6B, in the touch panel 200, the first sensing layer 240 and the second sensing layer 250 are respectively adhered to both sides of the first transparent flexible substrate 210 having the first connection lines 220 and the second connection lines 230, so as to form touch sensing units (only the topmost first sensing layer 240 is illustrated in FIG. 6B), and the adhesive layer 270 is coated on the first sensing layer 240. Finally, the transparent cover 260 is attached to the first sensing layer 240 through the adhesive layer 270, so as to complete the touch panel 200.

Figure 6C:
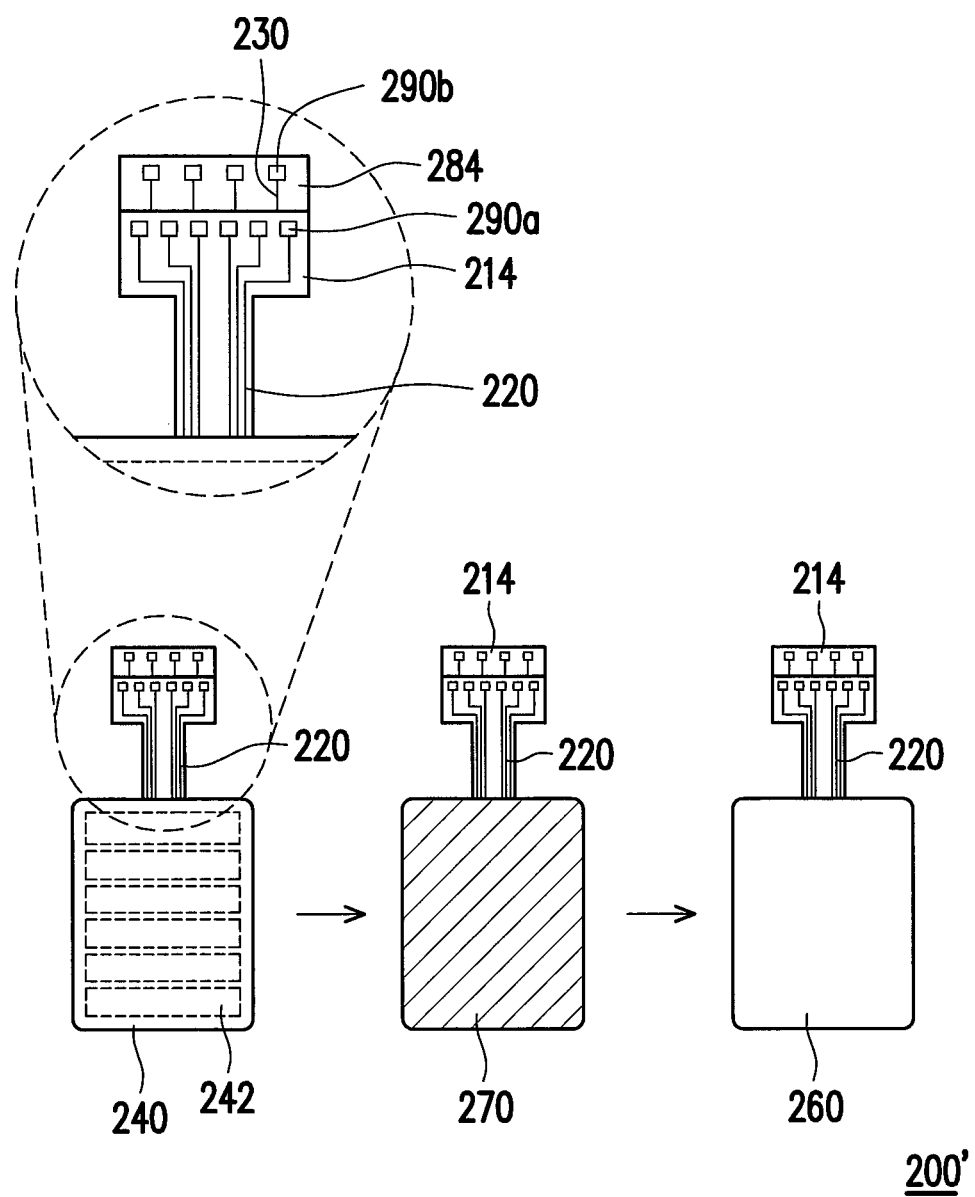
FIG. 6C is a top-view flowchart of fabricating the touch panel in FIG. 4.

FIG. 6C is a top-view flowchart of fabricating the touch panel in FIG. 4. Referring to FIG. 6C, in the touch panel 200', the first sensing layer 240 is adhered to the first transparent flexible substrate 210 having the first connection lines 220, and the second sensing layer 250 is adhered to the second transparent flexible substrate 280 having the second connection lines 230. Then, the first transparent flexible substrate 210 is attached to the second transparent flexible substrate 280 to form touch sensing units (only the topmost first sensing layer 240 is illustrated in FIG. 6C). Next, the adhesive layer 270 is coated on the first sensing layer 240. Finally, the transparent cover 260 is attached to the first sensing layer 240 through the adhesive layer 270, so as to complete the touch panel 200'.

It can be understood by comparing FIG. 6A, FIG. 6B, and FIG. 6C that in the touch panel 100, the FPC 140 is attached to the touch sensing units, while in the touch panel 200 and the touch panel 200', the touch sensing units are formed by directly disposing the connection lines and attaching the sensing layers onto the flexible substrates. Thus, the material cost and process for adhering the FPC 140 are saved in the touch panel 200 and the touch panel 200', and the lateral sizes of the touch panel 200 and the touch panel 200' without the FPC 140 are smaller than that of the touch panel 100 with the FPC 140. In addition, as described above, in the touch panel 100, the FPC 140 of a certain thickness is attached to the edge of the sensor 110. While in the touch panel 200 and the touch panel 200', the first carrying portion 212, the first sensing layer 240, the second sensing layer 250, and even the second carrying portion 282 have substantially the same shape and size. Thus, the touch panel 200 and the touch panel 200' can have evenly adhered areas.

Figure 7:
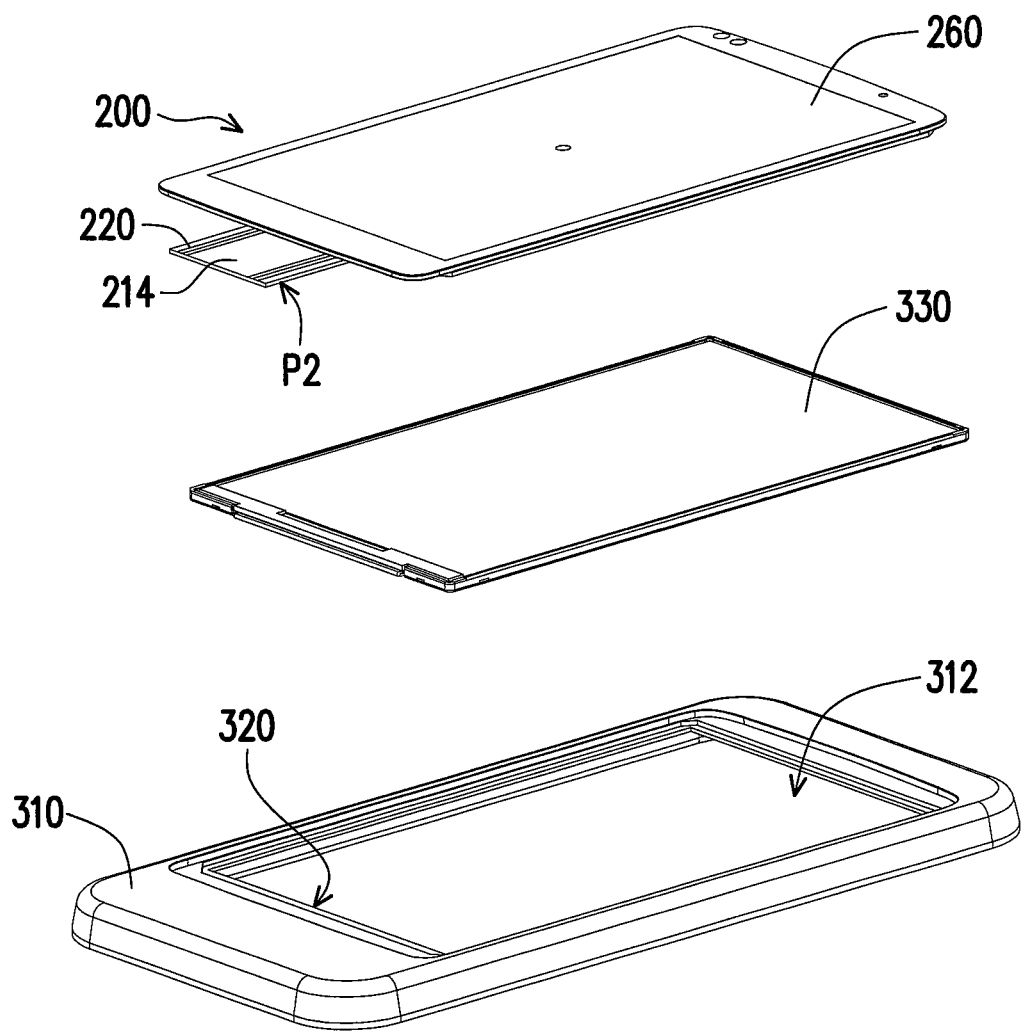
FIG. 7 is an explosion diagram of a handheld electronic device according to an embodiment of the application.

FIG. 7 is an explosion diagram of a handheld electronic device according to an embodiment of the application. Referring to FIG. 7, in the present embodiment, the handheld electronic device 300 includes a body 310, a main processor system 320, a display panel 330, and the touch panel 200 described above. The body 310 has a display opening 312. The main processor system 320 is disposed in the body 310. The display panel 330 is disposed at the display opening 312 and electrically connected to the main processor system 320. The touch panel 200 is disposed on the display panel 330.

For the clarity of illustration, FIG. 7 does not show all the components but only the outermost transparent cover 260 of the touch panel 200. In the present embodiment, when the touch panel 200 is disposed on the display panel 330 and assembled to the display opening 312, the display opening 312 is covered by the outermost transparent cover 260 of the touch panel 200, and a user can operate the handheld electronic device 300 by touching the transparent cover 260.

Additionally, the first leading portion 214 protruded from the touch panel 200 is disposed in the body 310 through the display opening 312, so that the first connection lines 220 and the second connection lines 230 (as shown in FIG. 2) can be electrically connected to the main processor system 320 through the first leading portion 214. Accordingly, the main processor system 320 of the handheld electronic device 300 can supply power, and the power can be transmitted to the touch panel 200 through the first connection lines 220 and the second connection lines 230, so that the touch panel 200 can achieve the touch sensing function.

When the user touches the touch panel 200 to input a command, the command signal is transmitted to the main processor system 320 through the first connection lines 220 and the second connection lines 230. Accordingly, the user can operate the handheld electronic device 300 by touching the touch panel 200. After that, information output by the handheld electronic device 300 is displayed on the display panel 330. In the present embodiment, the adhesive layers of the touch panel 200 are made of transparent materials, so that the user can view the information and continues to input commands according to requirements through the transparent touch panel 200.

Figure 8:
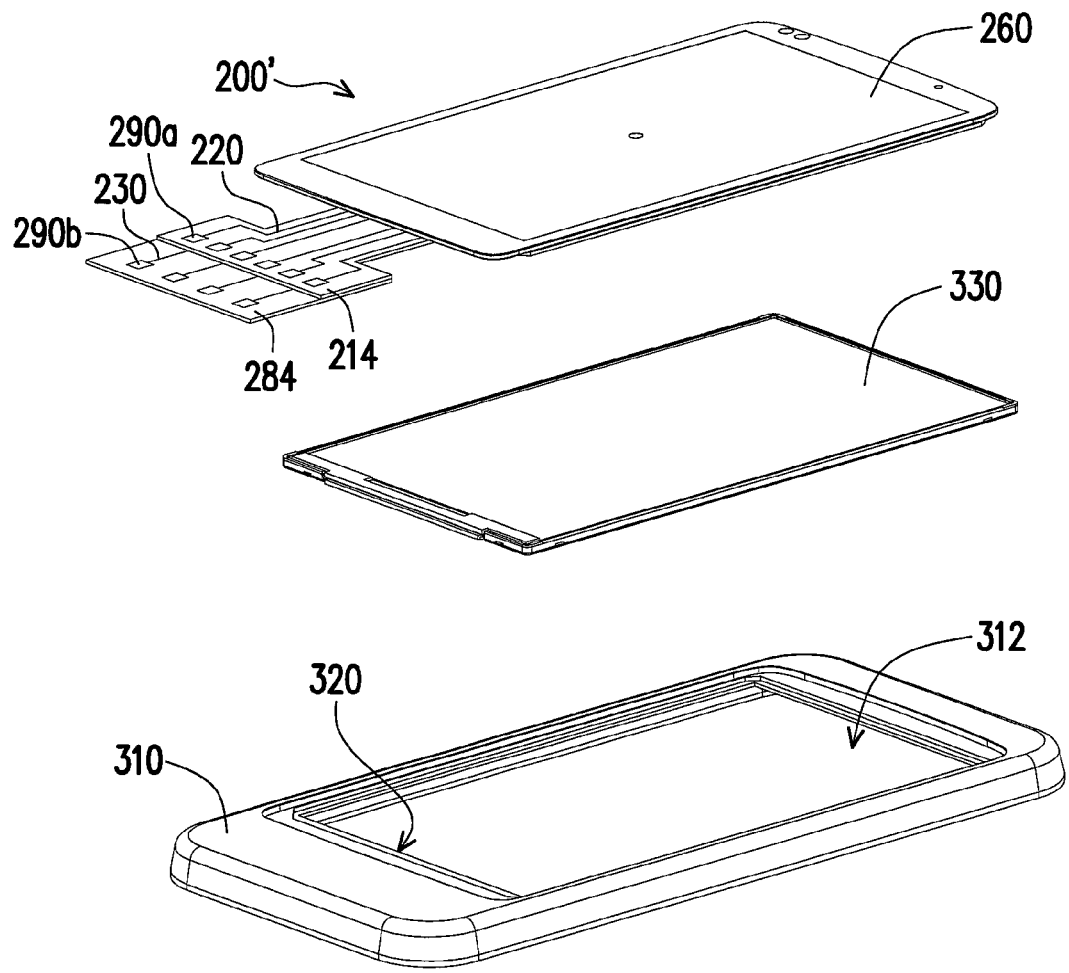
FIG. 8 is an explosion diagram of a handheld electronic device according to another embodiment of the application.

FIG. 8 is an explosion diagram of a handheld electronic device according to another embodiment of the application. Referring to FIG. 8, in the present embodiment, the handheld electronic device 300' includes a body 310, a main processor system 320, a display panel 330, and the touch panel 200' described above. The major difference between the handheld electronic device 300' and the handheld electronic device 300 is that the handheld electronic device 300' has the touch panel 200 instead of the touch panel 200'.

For the clarity of illustration, FIG. 8 does not show all the components of the touch panel 200' but only the outermost transparent cover 260 thereof. In the present embodiment, when the touch panel 200' is disposed on the display panel 330 and assembled to the display opening 312, the display opening 312 is covered by the outermost transparent cover 260 of the touch panel 200', and a user can operate the handheld electronic device 300' by touching the transparent cover 260.

In addition, the first leading portion 214 and the second leading portion 284 protruded from the touch panel 200' is disposed in the body 310 through the display opening 312, so that the first connection lines 220 and the second connection lines 230 can be electrically connected to the main processor system 320 through the first leading portion 214 and the second leading portion 284.

Figure 9:
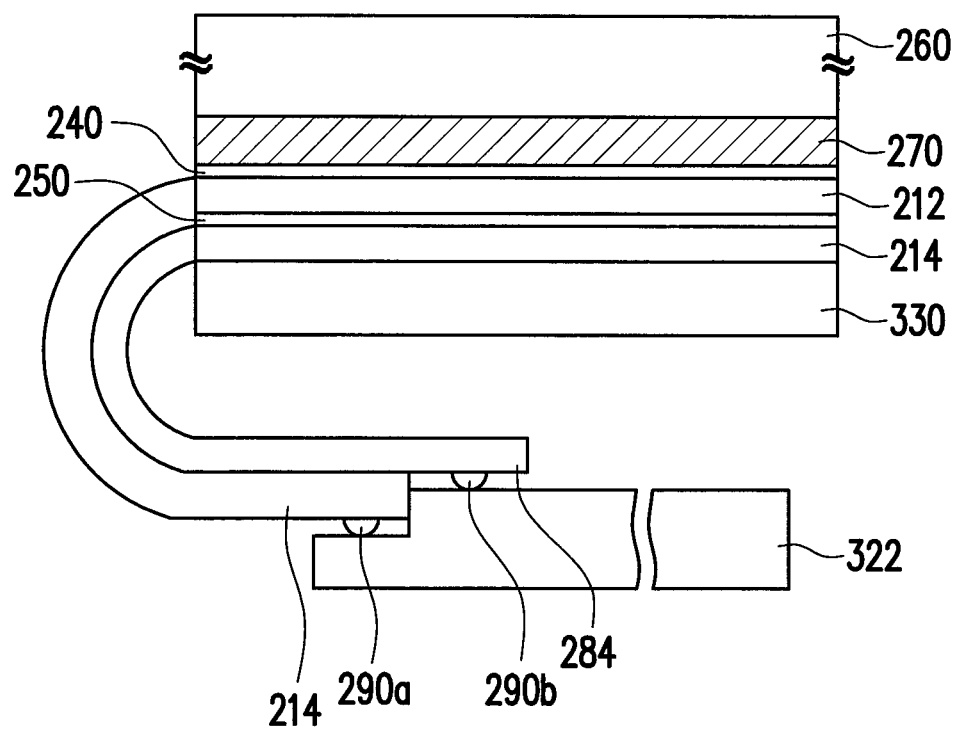
FIG. 9 is an enlarged view of the main processor system of the handheld electronic device in FIG. 8.

FIG. 9 is an enlarged view of the main processor system of the handheld electronic device in FIG. 8. Referring to FIG. 9, in the present embodiment, the first leading portion 214 and the second leading portion 284 can be bent to a back side of the display panel 330 relative to the touch panel 200' along the edge of the display panel 330. The main processor system 320 includes a circuit board 322. The circuit board 322 has a stepped junction jointed with the stepped structure of the touch panel 200' such that the first contacts 290$a$ and the second contacts 290$b$ are electrically connected to the main processor system 320.

Accordingly, the main processor system 320 of the handheld electronic device 300' can supply power, and the power can be transmitted to the touch panel 200' through the first contacts 290$a$, the second contacts 290$b$, the first connection lines 220, and the second connection lines 230, so that the touch panel 200' can achieve the touch sensing function.

When a user touches the touch panel 200' to input a command, the command signal is transmitted to the main processor system 320 through the first connection lines 220 and the second connection lines 230. Accordingly, the user can operate the handheld electronic device 300' by touching the touch panel 200'. After that, information output by the handheld electronic device 300' is displayed on the display panel 330. In the present embodiment, the adhesive layers of the touch panel 200' are made of transparent materials, so that the user can view the information and continues to input commands according to requirements through the transparent touch panel 200'.

As described above, the application provides a touch panel and a handheld electronic device using the same. In the touch panel, a plurality of first connection lines and a plurality of second connection lines are respectively disposed on carrying portions of transparent flexible substrates and extended out of the substrates, and signals are transmitted to transparent electrode patterns of sensing layers through the connection lines, so that the FPC in the conventional technique is replaced and a touch sensing function is achieved by the touch panel. Thereby, part of the adhering process and the cost of the adhesive material are saved, the lateral size of the touch panel is reduced, and evenly adhered areas are achieved in the touch panel provided by the application. Moreover, by assembling the touch panel onto a handheld electronic device as an input device, a user can touch the touch panel to input commands and the operation of the handheld electronic device can be made very convenient.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A touch panel, comprising:
   a first transparent flexible substrate, having a first side and a second side opposite to the first side, and comprising a first carrying portion and a first leading portion connected to an edge of the first carrying portion;
   a plurality of first connection lines, disposed at the first side, and extended from the first carrying portion to the first leading portion;
   a plurality of second connection lines, extended from the first carrying portion to the first leading portion;
   a first sensing layer, comprising a plurality of first transparent electrode patterns, disposed at the first carrying portion, and located at the first side, wherein the first transparent electrode patterns are respectively connected with the first connection lines, the first sensing layer is attached to the first side of the first transparent flexible substrate, and the first connection lines, which cover a portion of the first sensing layer, are located between the first sensing layer and the first transparent flexible substrate and are led out of the first sensing layer through the first leading portion;
   a second sensing layer, comprising a plurality of second transparent electrode patterns, disposed at the first carrying portion, and located at the second side, wherein the second transparent electrode patterns are respectively connected with the second connection lines; and
   a second transparent flexible substrate, wherein the first transparent flexible substrate is attached to the second transparent flexible substrate, the second sensing layer is located between the first transparent flexible substrate and the second transparent flexible substrate and attached to the second transparent flexible substrate, and the second connection lines, which cover a portion of the second sensing layer, are located between the second sensing layer and the second transparent flexible substrate and are led out of the second sensing layer through a second leading portion.

2. The touch panel according to claim 1, wherein the second transparent flexible substrate comprises a second carrying portion and the second leading portion connected to a side of the second carrying portion, and the first carrying portion and the second carrying portion have substantially a same shape and a same size.

3. The touch panel according to claim 2, wherein the first leading portion covers the second leading portion and exposes an endmost part of an upper surface of the second leading portion, so as to form a stepped structure at ends of the first leading portion and the second leading portion.

4. The touch panel according to claim 3 further comprising:
   a plurality of first contacts, disposed on an upper surface of the first leading portion, and respectively connected with the first connection lines; and
   a plurality of second contacts, disposed on the exposed endmost part of the upper surface of the second leading portion, and respectively connected with the second connection lines.

5. The touch panel according to claim 1, wherein a material of the second transparent flexible substrate comprises a polymer.

6. The touch panel according to claim 1 further comprising:
   a transparent cover, adhered on the first sensing layer; and
   an adhesive layer, disposed between the transparent cover and the first sensing layer.

7. The touch panel according to claim 1, wherein a material of the first transparent flexible substrate comprises a polymer.

8. The touch panel according to claim 1, wherein a material of the first connection lines and the second connection lines comprises a metal or a transparent conductive material.

9. The touch panel according to claim 1, wherein the first connection lines and the second connection lines are disposed along an edge of the first carrying portion.

10. The touch panel according to claim 1, wherein the first transparent electrode patterns and the second transparent electrode patterns are respectively striped patterns, and an extended direction of the first transparent electrode patterns is substantially perpendicular to an extended direction of the second transparent electrode patterns.

11. The touch panel according to claim 1, wherein a material of the first transparent electrode patterns and the second transparent electrode patterns comprises a transparent conductive material.

12. A handheld electronic device, comprising:
   a body, having a display opening;
   a main processor system, disposed in the body;
   a display panel, disposed at the display opening, and electrically connected to the main processor system; and
   a touch panel, disposed on the display panel, comprising:
      a first transparent flexible substrate, having a first side and a second side opposite to the first side, and comprising a first carrying portion and a first leading portion connected to an edge of the first carrying portion;
      a plurality of first connection lines, disposed at the first side, and extended from the first carrying portion to the first leading portion;
      a plurality of second connection lines, disposed at the second side, and extended from the first carrying portion to the first leading portion;
      a first sensing layer, comprising a plurality of first transparent electrode patterns, disposed at the first carrying portion, and located at the first side, wherein the first transparent electrode patterns are respectively connected with the first connection lines, the first sensing layer is attached to the first side of the first transparent flexible substrate, and the first connection lines, which cover a portion of the first sensing layer, are located between the first sensing layer and the first transparent flexible substrate and are led out of the first sensing layer through the first leading portion;

a second sensing layer, comprising a plurality of second transparent electrode patterns, disposed at the first carrying portion, and located at the second side, wherein the second transparent electrode patterns are respectively connected with the second connection lines; and a second transparent flexible substrate, wherein the first transparent flexible substrate is attached to the second transparent flexible substrate, the second sensing layer is located between the first transparent flexible substrate and the second transparent flexible substrate and attached to the second transparent flexible substrate, and the second connection lines, which cover a portion of the second sensing layer, are located between the second sensing layer and the second transparent flexible substrate and are led out of the second sensing layer through a second leading portion.

13. The handheld electronic device according to claim 12, wherein the second transparent flexible substrate comprises a second carrying portion and the second leading portion connected to an edge of the second carrying portion, and the first carrying portion and the second carrying portion have substantially a same shape and a same size.

14. The handheld electronic device according to claim 13, wherein the first leading portion covers the second leading portion and exposes an endmost part of an upper surface of the second leading portion, so as to form a stepped structure at ends of the first leading portion and the second leading portion.

15. The handheld electronic device according to claim 14 further comprising:

a plurality of first contacts, disposed on an upper surface of the first leading portion, and respectively connected with the first connection lines; and a plurality of second contacts, disposed at the exposed endmost part of the upper surface of the second leading portion, and respectively connected with the second connection lines.

16. handheld electronic device according to claim 15, wherein the first leading portion and the second leading portion are bent to a back side of the display panel relative to the touch panel along an edge of the display panel, the main processor system comprises a circuit board, and the circuit board has a stepped junction jointed with the stepped structure of the touch panel such that the first contacts and the second contacts are electrically connected to the main processor system.

* * * * *